US 9,642,482 B2

(12) United States Patent
Flowers et al.

(10) Patent No.: US 9,642,482 B2
(45) Date of Patent: May 9, 2017

(54) PORTABLE BEVERAGE CONTAINER WITH ULTRASONIC WELDED JOINT AND METHOD OF MAKING THE SAME

(71) Applicant: Tervis Tumbler Company, North Venice, FL (US)

(72) Inventors: Sean T. Flowers, Cincinnati, OH (US); James M. Sheely, Toledo, OH (US); William D. Voyles, Toledo, OH (US)

(73) Assignee: Tervis Tumbler Company, North Venice, FL (US)

( * ) Notice: Subject to any disclaimer, the term of this patent is extended or adjusted under 35 U.S.C. 154(b) by 0 days.

(21) Appl. No.: 13/692,123

(22) Filed: Dec. 3, 2012

(65) Prior Publication Data

US 2013/0140316 A1  Jun. 6, 2013

Related U.S. Application Data

(60) Provisional application No. 61/567,234, filed on Dec. 6, 2011.

(51) Int. Cl.
*A47J 41/00* (2006.01)
*A47G 19/22* (2006.01)
(Continued)

(52) U.S. Cl.
CPC .......... *A47G 19/2272* (2013.01); *B29C 65/08* (2013.01); *B29C 66/12463* (2013.01);
(Continued)

(58) Field of Classification Search
CPC ... B69C 66/71; A47J 41/0072; A47J 41/0077; A47G 23/00; A47G 19/2272;
(Continued)

(56) References Cited

U.S. PATENT DOCUMENTS 3,038,623 A * 6/1962 Schwarz et al. ............. 215/12.1
3,827,925 A * 8/1974 Douglas ........................ 156/73.1
(Continued)

OTHER PUBLICATIONS

Eastman Publication TRS-216B 9/11, Ultrasonic welding Eastman polymers, first page after title page.*
(Continued)

*Primary Examiner* — Anthony Stashick
*Assistant Examiner* — James M Van Buskirk
(74) *Attorney, Agent, or Firm* — Caesar Rivise, PC

(57) ABSTRACT

A product, e.g., insulated beverage bottle having a lid, and method of making it are disclosed. The product includes an outer hollow blow molded vessel in which an inner hollow blow molded vessel, is disposed. Each of vessel has a sidewall from which a flange projects. The flange of the outer vessel includes an annular wall. The flange of the inner vessel includes an engagement surface having an annular groove to receive the annular wall of the outer vessel. The inner vessel is arranged to be supported within the outer vessel on the flange of the outer vessel and with portions of the annular wall and annular groove engaging each other. Ultrasonic energy is applied to one of the flanges adjacent the engaging surfaces to concentrate the ultrasonic welding energy at those surfaces to produce a good double sided shear joint weldment thereat.

10 Claims, 4 Drawing Sheets

(51) Int. Cl.
*B29C 65/08* (2006.01)
*B29C 65/00* (2006.01)
*B29L 31/00* (2006.01)

(52) U.S. Cl.
CPC .... B29C 66/1312 (2013.01); B29C 66/30223 (2013.01); B29C 66/545 (2013.01); B29C 66/73921 (2013.01); B29C 66/8322 (2013.01); B29C 66/712 (2013.01); B29L 2031/7152 (2013.01)

(58) Field of Classification Search
CPC .......... B29C 66/12463; B29C 66/8322; B29C 66/30233; B29C 66/545; B29C 66/73921; B29C 66/1312; B29C 66/712; B29C 65/08; B29L 2031/7152
USPC .......... 220/23.87–23.88, 215, 567.3, 592.25, 220/62.18, 62.22, 592.2, 592.16, 1, 659, 220/657, 656, 62.12, 62.11, 23.89, 23.83, 220/592.17, 359.1, 359.4, 359.5, 620, 220/270; 215/DIG. 6, 232; 53/478, 477, 53/476, 485
See application file for complete search history.

(56) References Cited

U.S. PATENT DOCUMENTS

| | | | | |
|---|---|---|---|---|
| 3,850,776 | A * | 11/1974 | Karobath et al. | 156/475 |
| 4,047,633 | A * | 9/1977 | Trombly | 220/592.2 |
| 4,243,280 | A * | 1/1981 | Deconinck | 312/140 |
| 4,301,942 | A * | 11/1981 | Kupperman et al. | 220/592.17 |
| 4,618,516 | A * | 10/1986 | Sager | 428/542.8 |
| 4,643,327 | A * | 2/1987 | Campbell | 220/215 |
| 4,865,014 | A * | 9/1989 | Nelson | 122/19.2 |
| 5,065,938 | A * | 11/1991 | Anderson | 229/125.08 |
| 5,515,995 | A * | 5/1996 | Allen et al. | 220/592.16 |
| 7,270,244 | B1 * | 9/2007 | Liu | A47J 41/0011 215/13.1 |
| 7,878,365 | B1 * | 2/2011 | Meehan | 220/737 |
| 2003/0071040 | A1 * | 4/2003 | Brodner et al. | 220/23.87 |
| 2010/0108693 | A1 * | 5/2010 | Zhang | B65D 81/3869 220/592.2 |

OTHER PUBLICATIONS

Eastman Tritan Copolyester—Secondary Operations Guide, pp. 1 to 12.

* cited by examiner

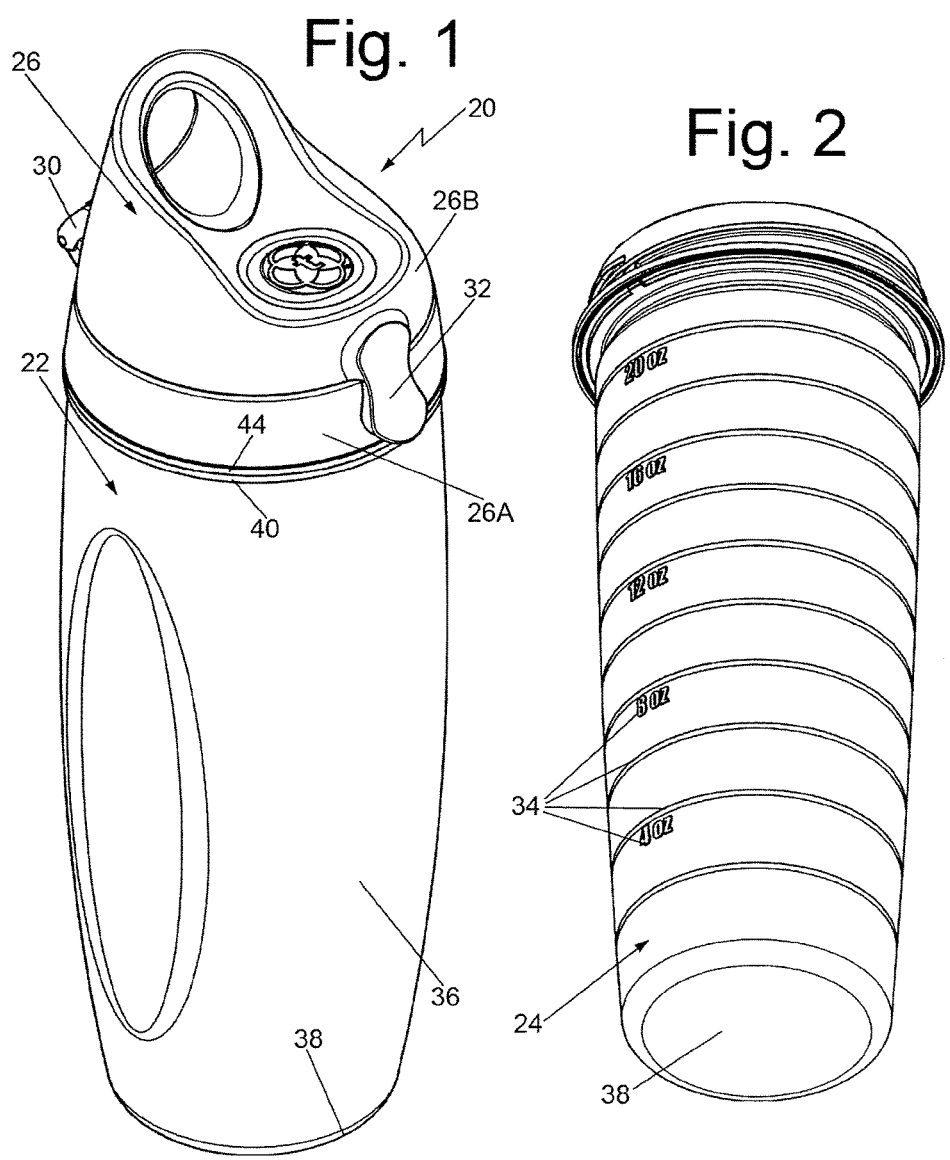

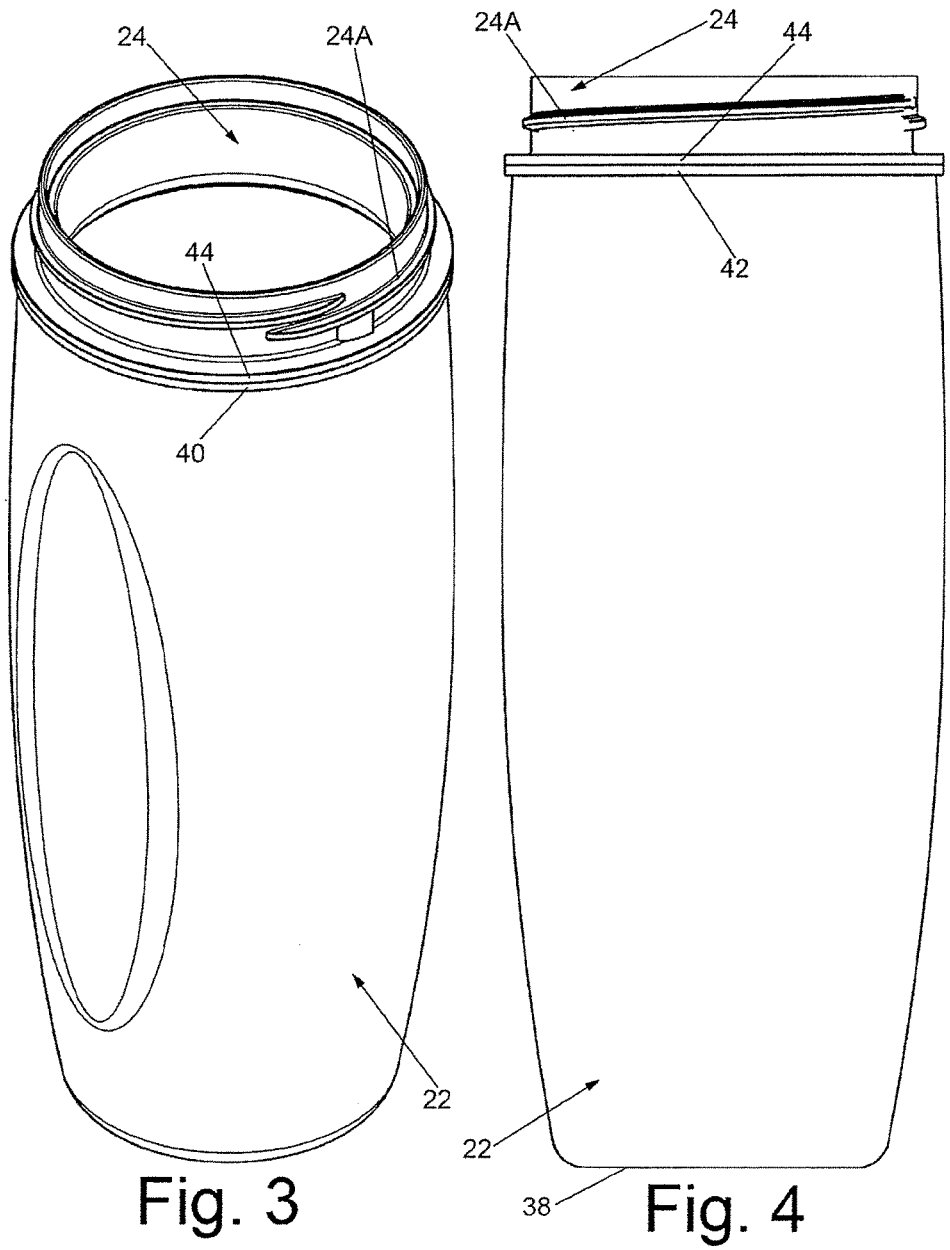

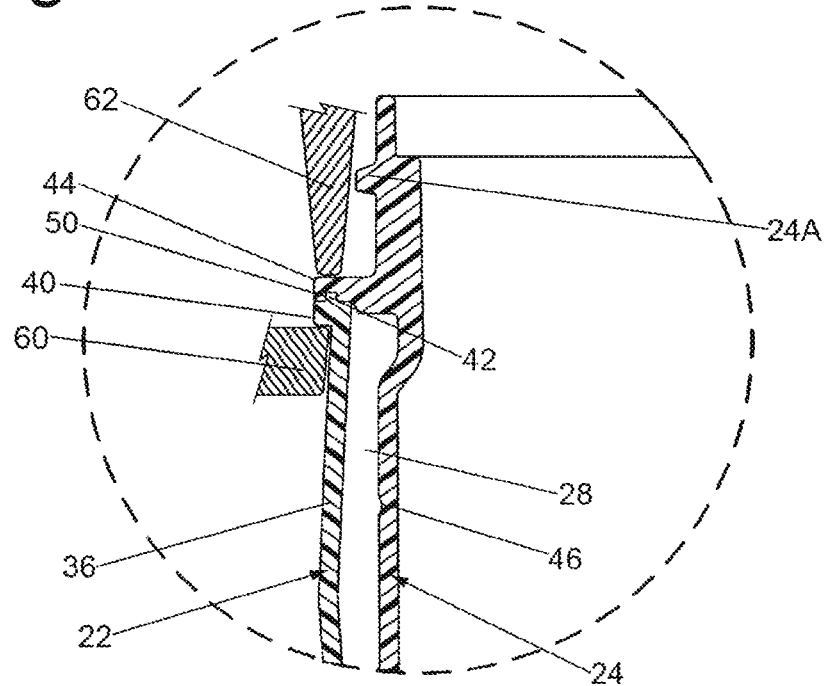
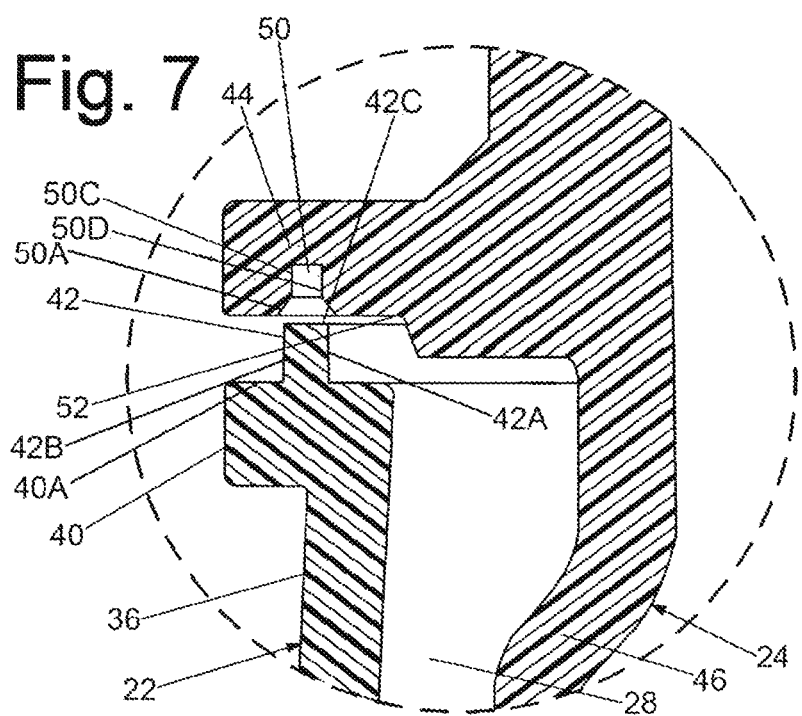

PORTABLE BEVERAGE CONTAINER WITH ULTRASONIC WELDED JOINT AND METHOD OF MAKING THE SAME

CROSS-REFERENCE TO RELATED APPLICATIONS

This application claims priority from U.S. Provisional Application Ser. No. 61/567,234 filed on Dec. 6, 2011, entitled Portable Beverage Container With Ultrasonic Welded Joint And Method Of Making The Same, which is assigned to the same assignee as this invention and whose disclosure is incorporated by reference herein.

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

This invention relates generally to blow molded containers and particularly to blow molded containers, e.g., insulated bottles, having two components, e.g., an outer container and an inner liner or vessel, which are fixedly secured together using ultrasonic welding.

BACKGROUND OF THE INVENTION

Heretofore it has been a common practice when fabricating and assembling containers or other products using blow molded components having thin sections to be joined together at such sections to join such components with adhesives because thin walled, blow molded components generally can't accommodate common ultrasonic weld joints. Unfortunately, as is known by those skilled in the art adhesive joining has several disadvantages. Examples of such disadvantages are, that their use releases volatile organic compounds into the atmosphere. In addition, adhesive joining typically requires the employment of fixtures or jigs to align and constrain the constituent parts during the time that the adhesive is curing. Such curing (or drying) of the adhesive can necessitate long curing or drying times depending upon the type of adhesive used. Moreover, excess adhesive must be removed post joining. Lastly, adhesively joined products may exhibit poor heat tolerance, making the products unsuitable to dishwasher cleaning or in other applications that are hot.

Some blow molded components may be bonded together using ultrasonic welding. As is known in ultrasonic welding entails mechanical vibrations of low amplitudes and high frequencies which generate cyclic deformation at the weld interface (joint). The combination of mechanical vibrations and axial force generates heat at specific weld joint geometries to enable flow and bonding to occur. Assemblies that are joined with ultrasonic welding must be robust enough or fixtured (i.e., supported with some type of fixture) since fixtures help localize the mechanical vibrations and improve the efficiency of heat generation.

Accordingly, a need exists for a method of permanently joining thin portions of blow molded components together to produce a product without the use of adhesives and to do so by use of ultrasonic welding on a expeditious and relatively low cost basis. The subject invention addresses those needs.

SUMMARY OF THE INVENTION

In accordance with one aspect of the invention there is provided a blow molded product (e.g., an insulated bottle having an openable lid) having an outer hollow member (e.g., a vessel) and an inner hollow member (e.g., a vessel). Each of those members is blow molded of a plastic material.

The outer member has a sidewall from which a flange projects. The inner member has a sidewall from which a flange projects. A first one of those flanges includes an annular wall upstanding therefrom, with the annular wall having a pair of sidewall surfaces tapering toward each other at a slight angle and terminating in an end surface of the annular wall. The other of the flanges includes an engagement surface having an annular groove to receive the annular wall. The annular groove has sidewalls which are separated from each other by a distance slightly less than the distance separating the sidewall surfaces of the annular wall at the top surface of the annular wall. The annular groove has an chamfered entryway contiguous with the engagement surface to facilitate entry of the annular wall into the annular groove. The inner member is arranged to be disposed within the outer member, with the flanges juxtaposed to each other so that the inner member is supported by the flange of the outer member and so that the annular wall of the first one of the flanges engages the chamfered entryway. At least one of the flanges has a surface to which an ultrasonic welding device can be brought into engagement, whereupon ultrasonic energy can be applied thereto and concentrated thereat to enable the annular wall to enter the annular groove and thereby create a good double sided shear joint weldment thereat.

In accordance with another aspect of this invention there is provided a method of ultrasonically welding a blow molded product, like that described above.

DESCRIPTION OF THE DRAWING

FIG. 1 is a is a isometric view of an exemplary product, e.g., an insulated bottle assembly and lid, constructed of blow molded components in accordance with the teaching of this invention;

FIG. 2 is an isometric view of one blow molded component, i.e., an inner liner or vessel, forming the bottle assembly of FIG. 1;

FIG. 3 is an isometric view of a portion of the insulated bottle shown in FIG. 1, showing two of its components, namely, an outer container or vessel in which the inner liner or vessel of FIG. 2 is disposed;

FIG. 4 is a side elevation view of the two components shown in FIG. 3;

FIG. 6 is an enlarged sectional view of the top portion of the components shown within the circular area designated by the number 6 in FIG. 5 after they been assembled and welded together by the application of ultrasonic welding energy to flanged portions of those components; and FIG. 7 is an even more enlarged sectional view of a portion of the components shown within the circle in FIG. 6, but prior to their assembly and welding to each other.

DETAILED DESCRIPTION OF THE PREFERRED EMBODIMENT

Figure 5:
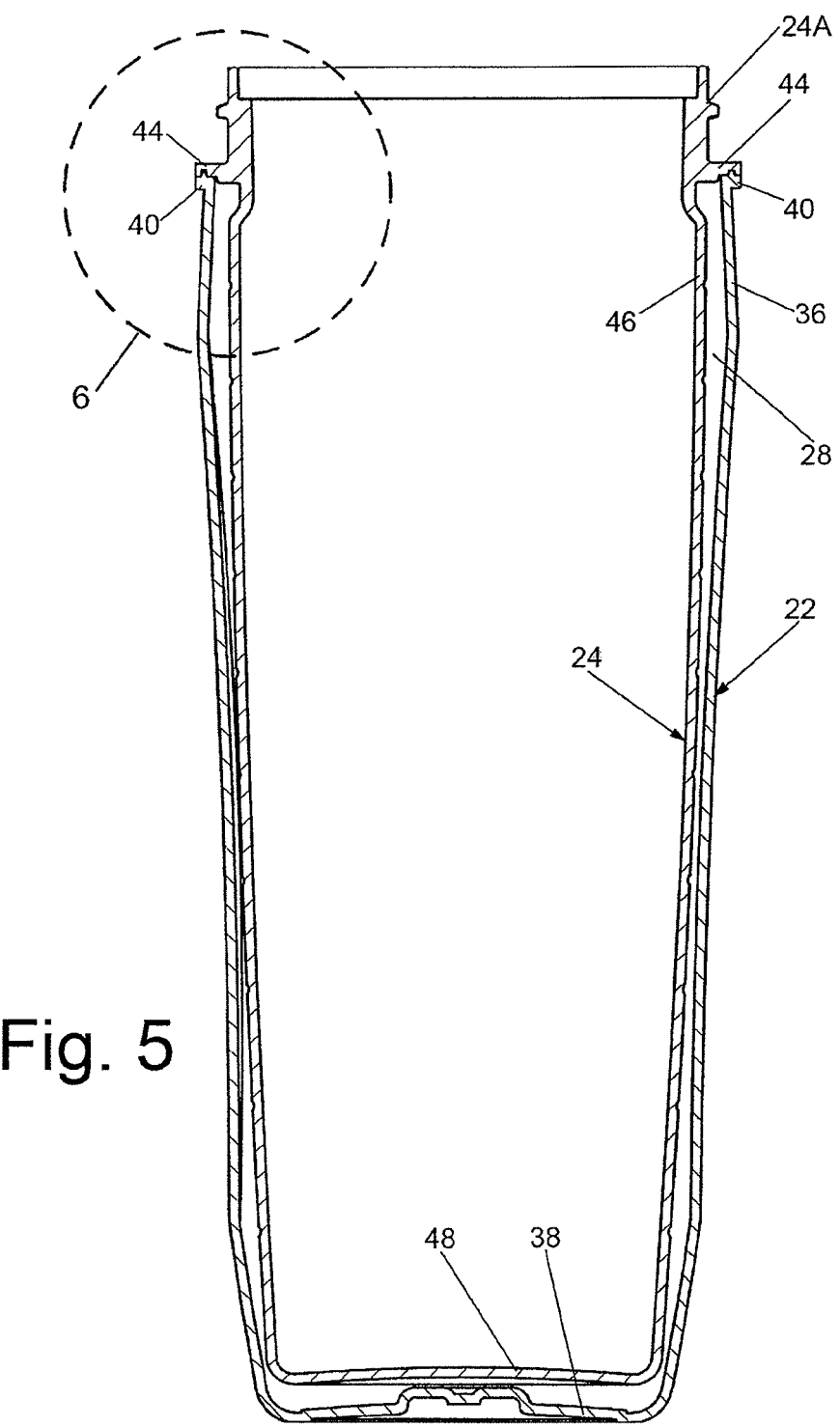
FIG. 5 is a somewhat enlarged vertical sectional view of the two components shown in FIGS. 3 and 4.

Referring now to the various figures of the drawing wherein like reference characters refer to like parts, there is shown at 20 in FIG. 1 one exemplary embodiment of an insulated bottle assembly including a lid which is constructed in accordance with this invention. It must be pointed out at this juncture that the bottle assembly 20 is merely illustrative of numerous products, be they containers or other products, comprising blow molded components that can be assembled together to form a unitary structure in accordance with this invention.

The bottle assembly is best seen in FIGS. 1 and 2 and basically comprises an assembly of a hollow outer body or vessel 22, a hollow inner liner or vessel 24, and a lid 26. The outer vessel 22 is a hollow member which is blow molded of a thermoplastic material. The hollow inner vessel 24 is also blow molded of a thermoplastic material (e.g., the same plastic material as the vessel 22 or some other material). As best seen in FIGS. 3, 4 and 5, the inner vessel 24 is disposed within the outer vessel 22, when so located they are separated from each other by an air-gap or space 28 (FIGS. 5, 6 and 7 and which will be described later) and portions of the vessels are then ultrasonically welded together to complete the subassembly. With this arrangement the inner vessel 24 of the bottle assembly is thermally insulated from the ambient atmosphere. The inner vessel 24 is arranged to receive any type of liquid, e.g., cold water or soda, hot tea or coffee, etc., to maintain its temperature. The lid assembly, which will be described later is openable, to enable a person to fill the bottle when desired and to take a drink from the bottle when desired.

As will be described in detail later the subject invention entails including a flange (to be identified and described later) on the inner hollow vessel 24 and including another flange (also to be identified and described later) on the outer hollow vessel 22. As mentioned above the inner vessel 24 is arranged to be disposed within and ultrasonically welded to the outer hollow vessel 22. The flange of the inner vessel serves the purpose of supporting the inner vessel on the flange of the outer component during that ultrasonic welding. Thus, the flanges provide a means to fixture the assembly, with the flange of the inner vessel providing a surface which can be supported by the flange of the outer vessel. This flange arrangement also facilitates alignment of the two components. Moreover, the use of a flange on the outer vessel eliminates supporting the assembly of the two components during the welding process by some means engaging the bottom of the outer vessel. In this regard, the flange of the outer container serves as a means to suspend the assembly from that flange without supporting the bottom of the outer vessel. This can be accomplished by placing the assembly into any type of support fixture, e.g., a clamshell fixture (not shown), having a surface on which the flange of the outer vessel can rest to suspend the assembly therefrom and with the inner surface of the walls of the clamshell fixture being spaced from the wall of the outer vessel.

In the exemplary embodiment shown and which will be described later, the surface of the flange on the inner vessel provides a location to which the horn or sonotrode of the ultrasonic welding device (not shown) can engage and get close enough to the contiguous portions of the flanges which are to be ultrasonically welded to focus and direct the ultrasonic energy to those portions. It should be noted at this point that for some applications the ultrasonic welding device may be brought into engagement with the undersurface of the flange of the outer vessel instead of or in addition to bringing it into engagement with the upper surface of the flange of the inner vessel. In either case, portions of the abutting surfaces of the flanges at which the ultrasonic joint is to be formed are preferably profiled or shaped in such a manner to concentrate the ultrasonic energy thereat to facilitate the formation of a good weld joint. Thus, those flanged surfaces make use of a conventional interference (double shear) joint. Alternatively, those surfaces may make use of a triangular protrusion energy director (e.g., an upstanding triangular annular protrusion from one flange surface and an planar surface on the other flange) or any other conventional joints or profiling that are known to those skilled in the art of ultrasonic welding, to create a good ultrasonic weld joint. In the exemplary embodiment shown and which will be described later, the flanges include a double sided shear joint.

Before discussing the details of the two vessels a brief discussion of the details of the lid 26 is in order. To that end, as can be seen in FIG. 1 the lid 26 is an assembly that is also formed of a plastic material (which can be the same or a different material from the material(s) forming the outer vessel 22 and the inner vessel 24) or of any other material. In particular, the lid assembly includes a ring portion 26A and a cap portion 26B. The ring portion 26A is arranged to be threadedly connected (screwed onto) a correspondingly threaded portion 24A (FIGS. 3 and 4), which will be described later, forming the top portion of the inner vessel 24. The cap portion 26B is arranged to cover or seal off the interior of the bottle, i.e., the inner vessel 24, when it is in the closed position shown in FIG. 1. The cap portion 26B is pivotably connected to the ring portion 26A by a hinge 30 so that the cap portion of the lid may be pivoted up or away from the bottle's body to provide access to the interior of the bottle, i.e., to the interior of the inner vessel 24. This feature enables one to readily fill the vessel 24 or to drink from the vessel. A clasp or latch 32 is provided on the cap portion of the lid to engage the ring portion of the lid to hold the cap portion in the closed position, like shown in FIG. 1, to thereby close off the interior of the bottle. In accordance with a preferred exemplary embodiment of this invention, the outer body is formed of a transparent material and the inner liner or vessel includes molded indicia 34 in the form of lines and associated numbers on it indicating the volume of liquid that is within the vessel. Thus, the user of the vessel can look through the transparent outer wall of the body 22 to seen the level of liquid within the inner vessel to determine how much, e.g., how many ounces, is in the bottle.

Turning now to FIGS. 3-5 further details of the outer container or body 22 will now be described. As can be seen the body 22 includes a generally cylindrical sidewall 36, and a bottom wall 38. The top end portion of the sidewall 36 is in the form of a radially outwardly projecting flange 40. The details of the flange 40 are best seen in FIG. 7. Thus, it can be seen that the flange 40 includes an annular wall 42 upstanding from the top surface 40A of the flange 40. The inner and outer surfaces, 42A and 42B, respectively, of the annular wall 42 taper inward toward each other, terminating in a top surface 42C. In one exemplary embodiment of this invention they taper together at an angle of approximately 1.0 degrees and are separated from each other at the top surface 42C of the annular wall by approximately 1.0 mm.

The flange 40 is arranged to engage a mating flange 44 (to be described shortly) on the inner vessel 24 to close off the insulating space 28. The inner vessel 24 includes a generally cylindrical sidewall 46 on which the indicia 34 are located and a bottom wall 48. The top end portion of the sidewall 46 includes the heretofore identified flange 44, which projects radially outwardly from the sidewall 46 of the vessel 24 as best seen in FIG. 6. As best seen in FIG. 7, the undersurface 52 of the flange 44 is in the form of a ledge of generally complementary shape to the top surface 40A of the flange 40. The flange 44 includes an engagement surface in the form of an annular recess or groove 50 extending into the undersurface 52 of the flange 44. The annular groove 50, formed by sidewalls 50C and 50D, is arranged to receive the annular wall 42 of the flange 40 to join the two flanges 40 and 44 to each other in a double sided shear joint when the ultrasonic energy is applied to the joint, as will be described later. The annular groove 50 is slightly smaller than the annular wall 42. In particular, in the exemplary embodiment of this invention mentioned above the sidewalls extend parallel to each other and are separated from each other by approximately 0.6 mm. Thus, the width of the annular groove 50 is less than the thickness of the annular wall 42. The entryway to the groove 50, i.e., the portion 50A of the annular groove contiguous with the undersurface 52 is chamfered. This arrangement facilitates the entry of the top portion of the annular wall 42 into the annular recess 50.

The undersurface 52 of the flange 44 is of a complementary shape to that of the flange 40 to receive the flange 40 therein with the upstanding annular wall 42 of the flange 40 is received within the annular groove 50 in the flange 44. To that end the size and shape of the annular recess is selected to closely receive the annular wall therein. As will be appreciated by those skilled in the art, this arrangement forms a tongue and groove interference (or double shear) joint, which is suitable for concentrating ultrasonic welding energy thereat. That tongue and groove interference joint can be formed by having the groove in the flange 40 and the annular wall in the flange 44. In fact, as mentioned above the flanges 40 and 42 may include other feature to concentrate the ultrasonic welding energy thereat in lieu of the exemplary tongue and groove joint. For example the top surface of the flange 40 may include an annular triangularly shaped energy director and the flange 44 may include a planar engagement surface which the energy director abuts.

In accordance with the exemplary embodiment of the invention shown, the outer diameter of the flange 40 and the flange 44 are the same so that when the inner vessel 24 is located within the outer body 22 and the annular wall is within the annular recess the outer surfaces of the two flanges are flush with each other.

The assembly of the inner and outer vessels together can be readily accomplished by placing the inner vessel 24 within the outer vessel 22, so that their flanges 44 and 40, respectively, are juxtaposed like shown in FIG. 7 and then the top portion of the annular flange 42 introduced into the chamfered entryway 50A of the groove. That subassembly may then be disposed within any suitable fixture, e.g., a clamshell fixture, so that a point of contact 60 of the undersurface of the flange 40 is disposed on a ledge or support surface (not shown) to suspend that subassembly from the fixture, and with the inner surface of the fixture spaced from the outer vessel, whereupon the only support for the subassembly is by the flange 40. The horn of an ultrasonic welding device (not shown) can then be brought into engagement with a point of contact 62 on the top surface of the flange 44 closely adjacent the tongue and groove joint formed by annular wall 42 and annular groove 50. The ultrasonic welding energy produced by the engagement of the horn with the flange will thus be concentrated at the tongue and groove joint, whereupon the plastic material thereat will melt enabling the annular wall to enter into the annular groove and fuse together to form a good weldment at the joint like shown in FIG. 6. The subassembly can then be removed from the fixture and the lid assembly screwed into place, thereby completing the fabrication and assembly of the bottle 20.

As should be appreciated by those skilled in the art when the two flanges 40 and 44 are in engagement they form a joint which is readily amenable to ultrasonic welding. Thus, this invention utilizes the abutting flanged projections to serves as an energy director to facilitate the ultrasonic welding of the constituent blow molded parts. Moreover, the flanges provide structural rigidity, align the mating components, and concentrate the ultrasonic vibrations and forces in the joint area. Thus, the subject invention eliminates the need for adhesive joining of blow molded components. Volatile organic compounds emitted from the adhesives are thereby also eliminated. Curing times are decreased from minutes or hours for adhesive joined parts to seconds for ultrasonically welded parts. The need to remove excess adhesive in a secondary operation is eliminated. The ultrasonically welded components exhibit superior tolerance to applied heat (such as in a dishwasher heated-dry cycle) than adhesive joined components.

Without further elaboration the foregoing will so fully illustrate our invention that others may, by applying current or future knowledge, adopt the same for use under various conditions of service.

We claim:

1. An insulated drinking vessel comprising a generally cylindrical outer vessel and a generally cylindrical inner vessel, each of said vessels being blow molded of a plastic material, said outer vessel having a sidewall from which a first flange projects outward, said first flange having an undersurface adapted for engagement by a separate support structure, said inner vessel having a sidewall from which a second flange projects, said first flange including an annular wall upstanding therefrom, said annular wall having a predetermined height and being formed by a pair of sidewall surfaces tapering toward each other at a slight angle, said annular wall terminating in a top surface, said second flange including an engagement surface having an annular groove to receive said annular wall to form a permanent welded joint, a first part or top of said annular groove being formed by a pair of sidewalls which are parallel to each other and separated from each other by a distance slightly less than the distance separating said sidewall surfaces of said annular wall at said top surface of said annular wall, a second part of said annular groove having a chamfered entryway contiguous with said engagement surface, said inner vessel being disposed within said outer vessel, with said first and second flanges juxtaposed to each other so that said inner vessel is supported by said first flange of said outer-vessel, with a portion of said annular wall contiguous with said end surface of said annular wall being received within said chamfered entryway, said undersurface of said first flange of said outer vessel being adapted to be engaged and suspended by a support structure so that said inner vessel and said outer vessel can be ultrasonically welded together while so suspended, and wherein said second flange has a surface that is adapted to be engaged with an ultrasonic welding device, whereupon ultrasonic energy can be applied thereto and concentrated thereat to ultrasonically weld said inner vessel and said outer vessel together so that said annular wall extends through said chamfered entryway and fully enters said first part of said annular groove to thereby create said permanent welded joint, said permanent welded joint being a double sided shear joint.

2. The assembly of claim 1 wherein said insulated drinking vessel includes an insulating space located between said outer vessel and said inner vessel.

3. The assembly of claim 1 wherein said annular wall projects upward from said flange of said outer vessel and wherein said annular groove is located in said flange of said inner vessel.

4. The assembly of claim 2 wherein said inner vessel includes a threaded top portion arranged to receive a threaded lid assembly thereon.

5. The assembly of claim 4 wherein said lid assembly includes a cap portion which is arranged to be pivoted between an open and a closed position, said cap portion being arranged to close off said hollow inner vessel when said lid is in said closed position.

6. A method of ultrasonically welding a blow molded product, said method comprising:

providing an outer hollow member that is blow molded of a plastic material and an inner hollow member that is blow molded of a plastic material, said outer member having a sidewall from which a flange projects, said inner member having a sidewall from which a flange projects, a first one of said flanges including an annular wall upstanding therefrom, said annular wall having a pair of sidewall surfaces tapering toward each other at a slight angle and terminating in an end surface of, said other of said flanges including an engagement surface having an annular groove to receive said annular wall, a first part of said annular groove having sidewalls which are separated from each other by a distance slightly less than the distance separating said sidewall surfaces of said annular wall at said top surface of said annular wall, a second part of said annular groove having a chamfered entryway contiguous with said engagement surface;

disposing said inner member within said outer member with said flanges of said members juxtaposed to each other wherein said end surface of said annular wall engages said chamfered entryway of said first part of said annular groove to form engaging surfaces; and bringing an ultrasonic welding device into engagement with a surface of one of said flanges adjacent said engaging surfaces and operating said device to apply ultrasonic welding energy thereto and concentrating said ultrasonic energy thereat to enable said annular wall to enter said annular groove and thereby create a good double sided shear joint weldment thereat.

7. The method of claim 6 wherein said outer member with said inner member located therein is suspended from a support structure by said flange of said outer member when said ultrasonic welding device is brought into engagement with a surface of one of said flanges to produce said weldment.

8. The method of claim 7 wherein the ultrasonic welding device is brought into engagement with said flange of said inner member.

9. The method of claim 8 wherein said annular wall projects upward from said flange of said outer member and wherein said annular groove is located in said flange of said inner member.

10. The method of claim 6 wherein said product is an insulated vessel assembly and wherein said outer member comprises a hollow vessel, wherein said inner member comprises a hollow vessel and wherein said insulated vessel assembly includes an insulating space located between said outer member and said inner member.

* * * * *